June 18, 1940. J. R. MITCHELL 2,205,268
AUTOMATIC PHONOGRAPH
Filed Nov. 3, 1938 9 Sheets-Sheet 2

Inventor
John R. Mitchell,
by Walter P. Guya
Attorney

Patented June 18, 1940

2,205,268

UNITED STATES PATENT OFFICE 2,205,268

AUTOMATIC PHONOGRAPH

John R. Mitchell, Dallas, Tex., assignor to The Rudolph Wurlitzer Company, North Tonawanda, N. Y., a corporation of Ohio Application November 3, 1938, Serial No. 238,580

16 Claims. (Cl. 274—10)

This invention relates to certain new and useful improvements in automatic selective phonographs.

It has for one of its objects to provide a phonograph of this character which is so designed and constructed as to effect the selective playing of both 10" and 12" records on one side or the other.

Another object of the invention is the provision of an automatic selective phonograph having a selectively-adjustable record magazine positioned at one side of the turntable with the records disposed in a plane at right angles to the turntable, and transfer means movable between the record magazine and the turntable for picking the selected record from the magazine and transferring and turning it to play position, and after play to restore that record to its initial position in the magazine.

A further object is to provide a record transfer means which is designed to not only effectually grip a record for transfer purposes but which is also so suspended as to be capable of a swiveling action to turn the record in one direction or the other to and from a horizontal play position.

A still further object is to provide a selective mechanism for governing the swiveling movements of the transfer means in one direction or the other to accordingly play one side or the other of the record.

Another object of the invention is to provide an efficient drive mechanism for controlling the various movements of the parts during the selective and transfer operations, together with means for initiating and governing the sequence operation of such parts.

Other features of the invention reside in the construction and arrangement of parts hereinafter described and particularly pointed out in the appended claims.

In its general organization this automatic phonograph which is designed to play both sides of 10" and 12" records and which is multi-selective, comprises a turntable; a record-supporting rack or magazine containing a supply of records, either 10" or 12"; a record pick-up or transfer member which swings in a path between the turntable and the magazine and functions to swing a previously selected record from the magazine into a playing position on the turntable, and after the record is played to pick up the record from the turntable and transfer it back to its initial position in the magazine, the records being stacked in edgewise fashion in the magazine and the pick-up or transfer member being designed to swing the record bodily, during the transfer from the stack to the turntable or vice versa, from its edgewise upright position to a horizontal playing position; means for pre-selecting at one time a plurality of the records or selections included in the magazine or program of the phonograph to be played, whether such selections be on one side or the other of the record disk; means for effecting a shifting of the record magazine in correlation with the preselective mechanism to properly set the magazine at a position wherein the record selected will be in operative position for engagement by the pick-up or transfer arm; a drive mechanism for operating the turntable, the selective movement of the magazine and the transfer movement of the pick-up arm; and a tone arm including a trip mechanism for automatically governing the cycle of operations of the phonograph.

Referring now to the drawings, showing more particularly the chassis of the phonograph, 20 indicates a supporting platform upon which the working parts of the phonograph are mounted and which platform is, in practice, mounted in a cabinet of appropriate design. The turntable 21 is mounted on an upright shaft or spindle 22 journaled in suitable bearings, the lower drive end of the shaft extending below the platform 20 and connected by reduction gearing 23 of usual construction with an electric motor 24 suitably supported on the other side of the platform. The tone arm 25 is of usual construction, being free to swing laterally during the playing of a record and being pivoted at 26 to swing vertically into and out of engagement with a record.

Disposed at one end of the platform is the record-supporting rack or magazine which preferably consists of a supporting frame 27 suitably suspended from the platform and including transversely-extending guideways or tracks 28 in which the movable record holder 29 is guided for fore and aft movement during the period of record-selection. Rising from this holder are a plurality of division plates or partitions 30 which are substantially L-shaped in elevation and which are spaced transversely of the holder to provide intervening spaces or pockets 31 for receiving and supporting the records 32 on edge in an upright position and in a plane at right angles to the plane of the turntable. At their lower edges the records are supported at opposite sides of their centers on transverse rods 33 or 34, the innermost set of rods 33 being positioned to properly support the 10" records in axial alinement, and the outermost set of rods 34 being positioned to properly support 12" records in axial alinement, and for a further purpose which will hereinafter appear. The upper edges of the upright portions of the partitions 30 may be champered on opposite sides, as indicated at 35, to facilitate the entry of the records into their respective pockets after being transferred from a playing position back to the magazine.

Figures 13, 14:
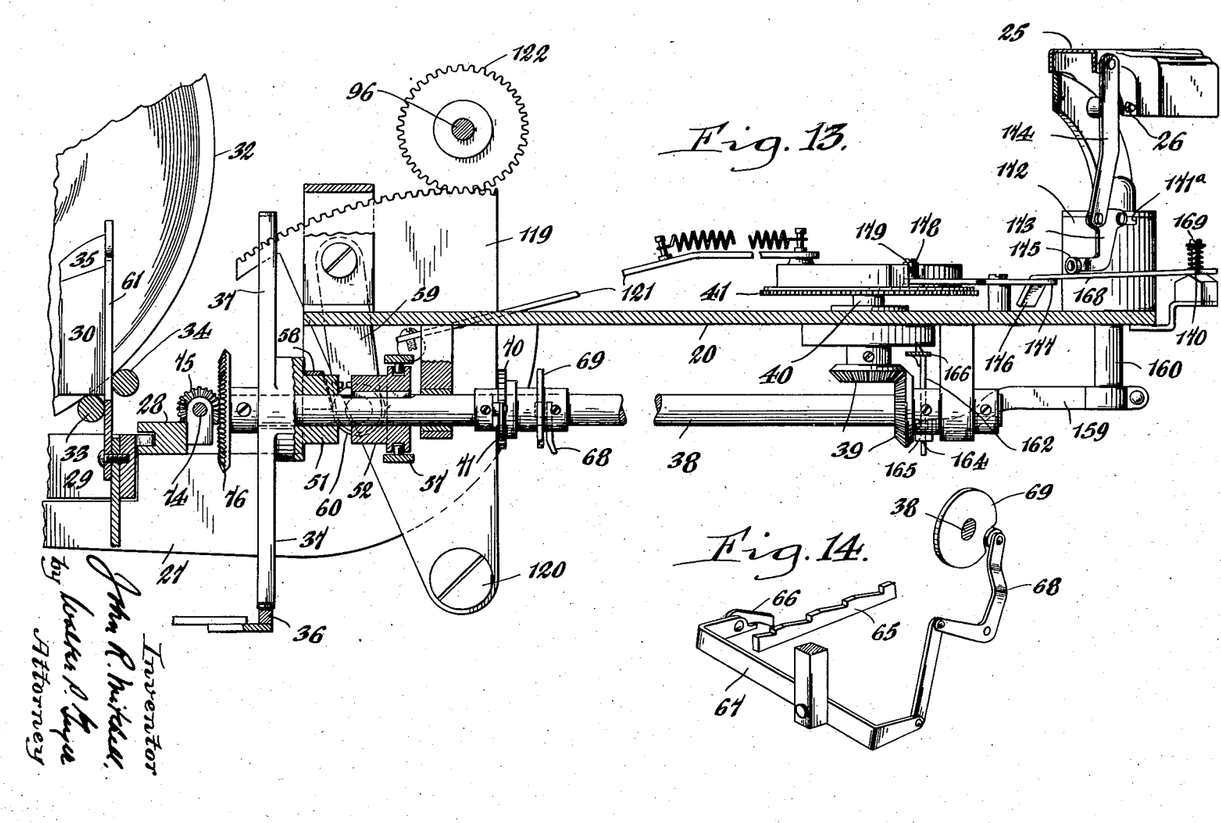
Figure 13 is an enlarged fragmentary, vertical, longitudinal section taken substantially on line 13—13, Figure 2.
Figure 14 is a fragmentary perspective view of the ratchet control for releasably maintaining the record magazine in a set position of selective adjustment.

The record holder 29 is adapted to be moved fore and aft of its supporting frame 27 for bringing it to one or another of a plurality of selective positions corresponding to the transfer point or station at which a selected record must be pre- positioned before it can be transferred from the rack to the turntable. For this purpose, a drive mechanism is provided for moving the holder in one direction, say backwardly, and a spring for moving it in the opposite or forward direction, such drive mechanism also controlling the transfer movements of the records to and from play position. The drive mechanism for actuating the holder consists of a horizontal rack bar 36 suitably suspended from the holder and a gear segment 37 in mesh with the rack and mounted on a horizontal shaft 38 journaled in suitable bearings applied to the underside of the platform 20 and connected by bevel gearing 39 to an upright shaft 40 extending upwardly through the platform and having a gear 41 fixed on its upper end. The gear 41 is driven from the turntable spindle 22, which spindle runs constantly during such time as the circuit of the motor 24 is closed, through the medium of a clutch-controlled driving gear 42 fixed on the spindle 22. This gear 42 is adapted to be releasably clutched to a train of gears 43, 44 and 45 to the driven gear 41. The clutch may consist of a disk 46 loosely mounted on the spindle 22 and to which the gear 43 may be attached, and mounted on this disk is a pivoted pawl 47 having a tooth 48 adapted to interlock with one or another of the teeth of the driving gear 42, so that when the clutch pawl is engaged motion will be transmitted to the clutch disk 46 and the train of gears associated therewith. A spring 49 applied to the pawl serves to constantly urge it to its clutched position, while a trip lever 50 serves at a predetermined time to either engage the clutch pawl to hold it in its disengaged position or to swing clear of the same and allow the spring to swing the pawl to its clutching position. The tripping of this lever 50 to its clutch-engaging position is automatically controlled by the tone arm at the end of its record play position, in the manner to be hereinafter described, so as to transmit motion to the drive means for actuating the record holder and transfer member. When the clutch pawl is engaged to effect the transmission of motion to the record holder 29, the shaft 38 is revolved to in turn, shift the rack 36 and in turn move the holder rearwardly. During the forward or reverse movement of the holder it is necessary that the gear segment 37 be free to respond to an idle movement imparted to it by the rack bar 36, and for this purpose such gear segment is loosely mounted on the shaft 38 and it has a clutch collar 51 thereon which is adapted for coupling engagement with a shiftable clutch collar 52 feathered on the shaft 38 in the manner shown in Figure 13. The shifting of this clutch collar is effected automatically at a predetermined time by a trip or actuating lever 53 pivoted at 54 and connected by a link 55 with a rock lever 56 carrying a yoke 57 engaging the shiftable clutch collar. During the shifting of the record holder 29 rearwardly the clutch collar 52 is clutched to the gear segment 37 so that motion is transmitted to the rack and thence to the holder. Means are provided for releasing the clutch when the holder reaches its rearmost position, and for this purpose the clutch collar 51 on the segment gear 37 is provided with a cam surface 58 which is adapted to rock a vertically-swinging pendant lever 59 in a direction to bring a roller 60 applied to its free end into engagement with the shiftable clutch collar 52 and shift it to released position, whereby the gear segment is free to idle when the holder is moved forwardly. The clutch remains in this released position to permit the idling of the sector gear until the record holder 29 reaches its extreme forward position at which time the front portion 61 of the holder encounters the trip lever 53 and restores the clutch collar 52 in engagement with the companion clutch collar 51 so that the parts are in readiness to effect the rearward propulsion of the record holder when called upon to do so.

Figure 1:
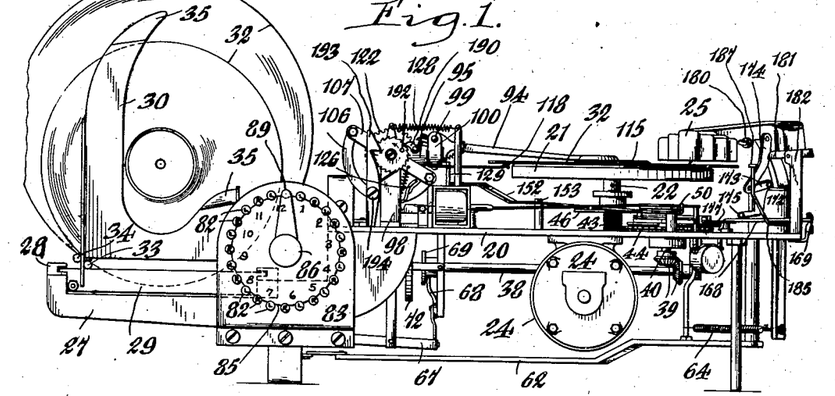
Figure 1 is a front elevation of the phonograph embodying my invention showing the parts in the record-playing position.
Figure 2:
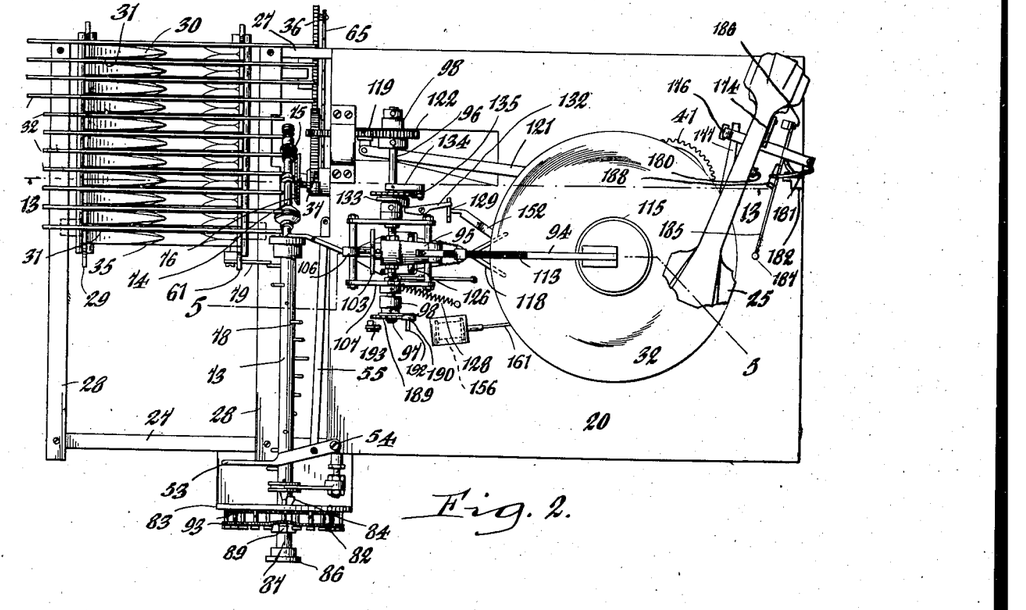
Figure 2 is a top plan view thereof.
Figures 3, 16, 19:
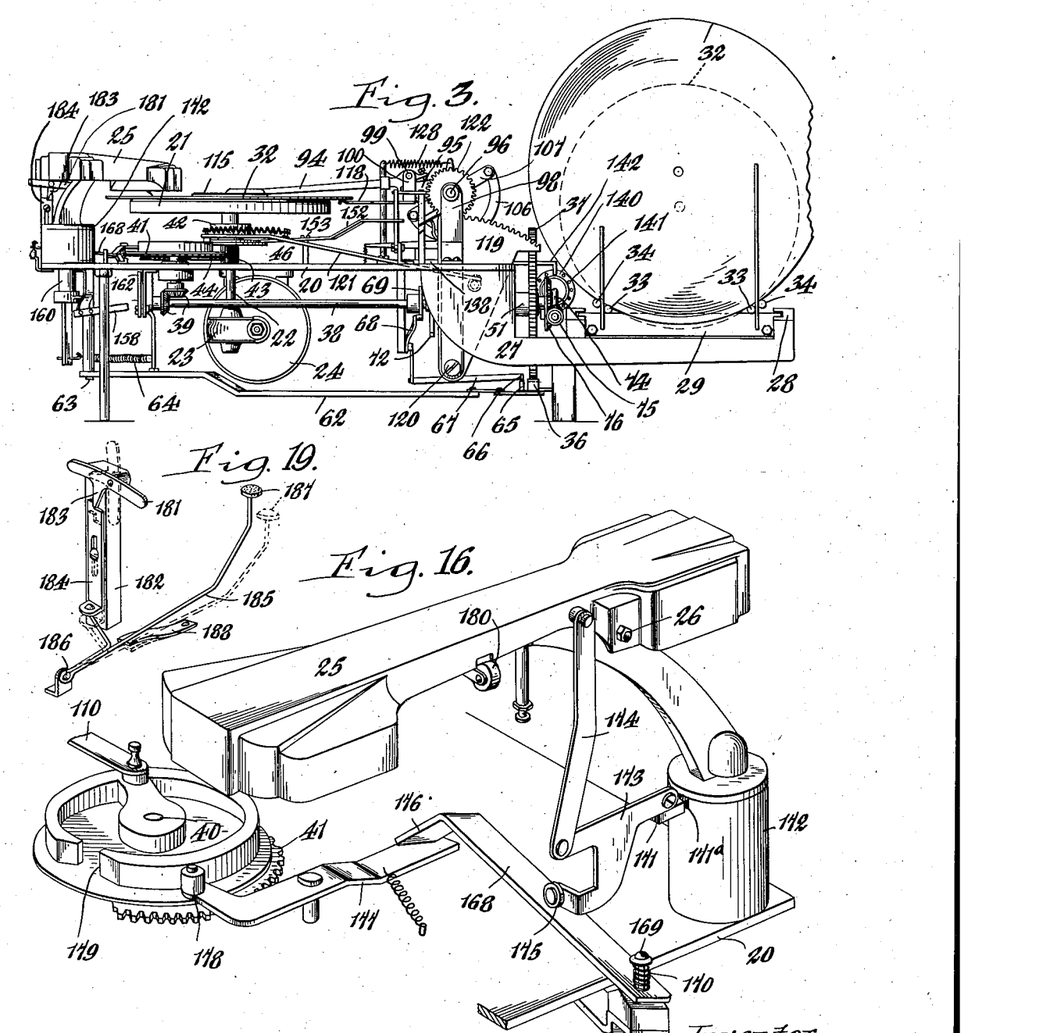
Figure 3 is a rear view of the same.
Figure 16 is a perspective view of the tone arm and associated parts for controlling its movements to and from record play position.
Figure 19 is a fragmentary perspective view of the means for governing the position of the tone arm to play 10" or 12" records.
Figure 17:
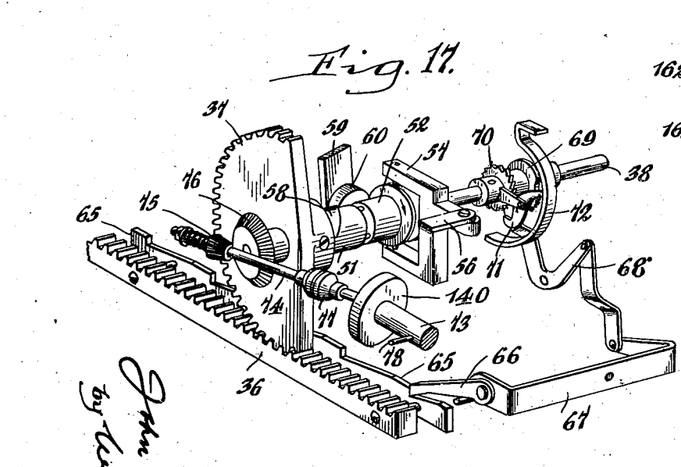
Figure 17 is a fragmentary perspective view of the drive means for operating the record magazine.

The forward movement of the record holder or magazine 29 is preferably effected by spring pressure, and as shown in Figures 1 and 3, a horizontally-swinging lever 62 is provided which is pivoted at 63 to the underside of the platform 20 and link-connected at its free end to the rack bar 36 of the holder, a spring 64 being connected to this lever for constantly urging it and the record holder to move in a forward direction. In order to maintain the record holder in a set or fixed position of selective adjustment against such spring pressure, there is provided a ratchet bar 65 movable with the holder and disposed alongside the rack bar 36 and with which a pawl 66 applied to one arm of a vertically-swinging rock lever 67 is adapted to releasably engage for arresting the forward movement of the holder. This lever is actuated at predetermined times in the cycle of operations of the machine to rock it to bring the pawl 66 into and out of engagement with the ratchet bar and for this purpose a bell crank lever 68 is provided which is link-connected at one end to the rock lever 67 and has a roller at its other end engaging a notched cam disk 69 loosely mounted on the shaft 38 and adapted to be revolved at certain times through the clutching of a ratchet wheel and pawl connection 70, 71 controlled by an arcuate cam track 72 with which the tail of the pawl is adapted to engage to govern its clutching and unclutching with the ratchet wheel, as shown in Figure 17. When the roller of the bell crank lever 68 drops into the notch of the cam disk 69 the pawl 66 is rocked out of engagement with the ratchet bar 65 so as not to interfere with the forward movement of the record-holder. When the periphery of the cam disk is engaged by the roller, the pawl is positioned to interlock with one or another of the teeth of the ratchet bar to latch the record holder in a set position, as during the time a selected record is played and until transferred back to the holders.

In selecting one or more records for play means are provided in association with the preselecting means, for successively arresting the holder 29 during its forward stroke at the proper predetermined selecting station to position the records for transfer from the holder to the turntable. By preference, the means for governing these selective positions of the holder consist of a horizontal transversely-extending sectional shaft 73, 74 journaled in suitable bearings applied to the holder frame 27 and having a bevel gear 75 applied to the rear shaft section 74 and meshing with a ring gear fixed on the driven shaft 38. Interposed between the shaft sections 73, 74 is a friction clutch 77 which normally forms a driving connection from the pinion shaft section 74 to the main shaft section 73, but which, should the latter shaft section be held against turning in the manner which will hereinafter appear, then the clutch will slip without motion being transmitted to said shaft section 73. Extending radially from the shaft section 73 and disposed in a spiral-like path in spaced relation lengthwise thereof are a plurality of stop pins 78, corresponding in number to the records borne by the holder, and adapted to be brought successively into operative position in the forward path of travel of the record holder 29, the latter being provided with a detent 79 which is adapted to abut and thereby arrest and control the forward movement of the record holder in a given position determined by the particular stop pin 78 encountered. This detent is beveled on its rear side as indicated at 80 so that during the rearward movement of the record holder this detent is free to rock clear of any stop pin in its path, the weight of the detent tending to restore it to its normal position in which it is retained by an abutment 81. The setting of the selector pin shaft 73 is predetermined in accordance with the record selected and to this end a plurality of annularly-arranged push buttons 82 are provided which are mounted upon a face plate 83 and are adapted to project rearwardly through the same into the path of a revolving arm 84 rotatable with the shaft 73, whereby the push pins act to arrest the turning of the shaft at selected stages and to thereby pre-position the corresponding companion radial pin 78 in a position to arrest the record holder 29 during its forward movement to bring the record selected at the proper stage for transfer from the holder to the turntable.

Figure 15:
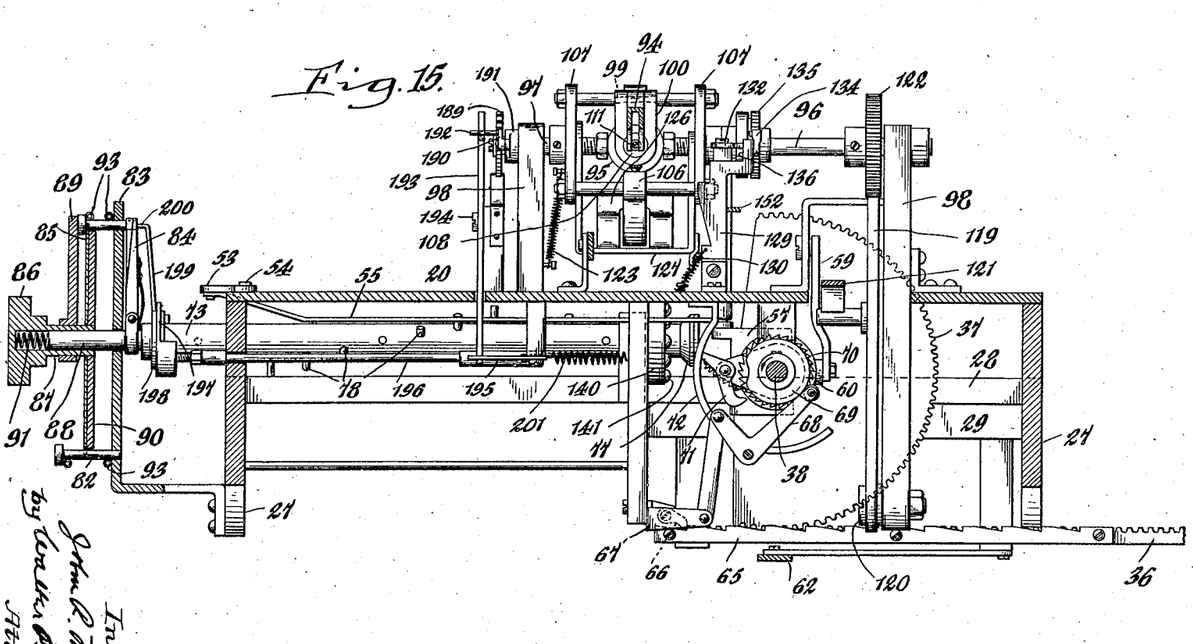
Figure 15 is an enlarged transverse vertical section taken in the plane of line 15—15, Figure 4.

Associated with the push buttons 82 is a dial 85 having numbers thereon corresponding to the push pins, this dial being disposed between the face plate 83 and the flanged ends of the push pins, as shown in Figure 15, and being notched at its periphery to partially embrace the pins and thereby retain the dial against turning. The numeral 86 indicates a selecting knob having a shank 87 guided on a forward extension 88 of the shaft 73, said knob being free to turn on said extension as well as move axially thereof within certain limits and having a radial arm 89 projecting therefrom which is adapted to be brought into operative engagement with one or another of the push buttons 82 to project them into selecting position. Applied to the rear end of the knob shank 87 and interposed between the face plate 83 and the dial 85 is a backing plate 90 for the latter which limits the fore and aft axial movement of the hand knob 86. A spring 91 fitted within the knob 86 and abutting against the shaft extension 88 serves normally to urge the knob and the parts carried thereby to an outward position wherein the arm 89 clears the push pins 82. The latter are frictionally held in their retracted or projected positions by coil springs bands 93 which are interlaced in bearing contact with the shanks of these pins in the manner shown in Figure 4. When pressing these push pins for selecting one or more records the user grasps the knob 86, turns it in one direction or the other to bring the arm opposite the pin to be selected whereupon the knob is shifted axially inward to correspondingly project the corresponding pin rearwardly beyond the rear side of the face plate where it is within the path of the revolving arm 84 on the shaft 73. When the knob is released the push pin remains in its projected position and the push pin actuating arm 89 is retracted clear of the remaining push pins, and any other record desired for pre-selection are then selected in like manner. When the push pins serve to arrest the shaft 73 in a predetermined position to select a companion record, they are subsequently projected to their normal position out of the path of the swinging arm 84.

Figures 5, 6:
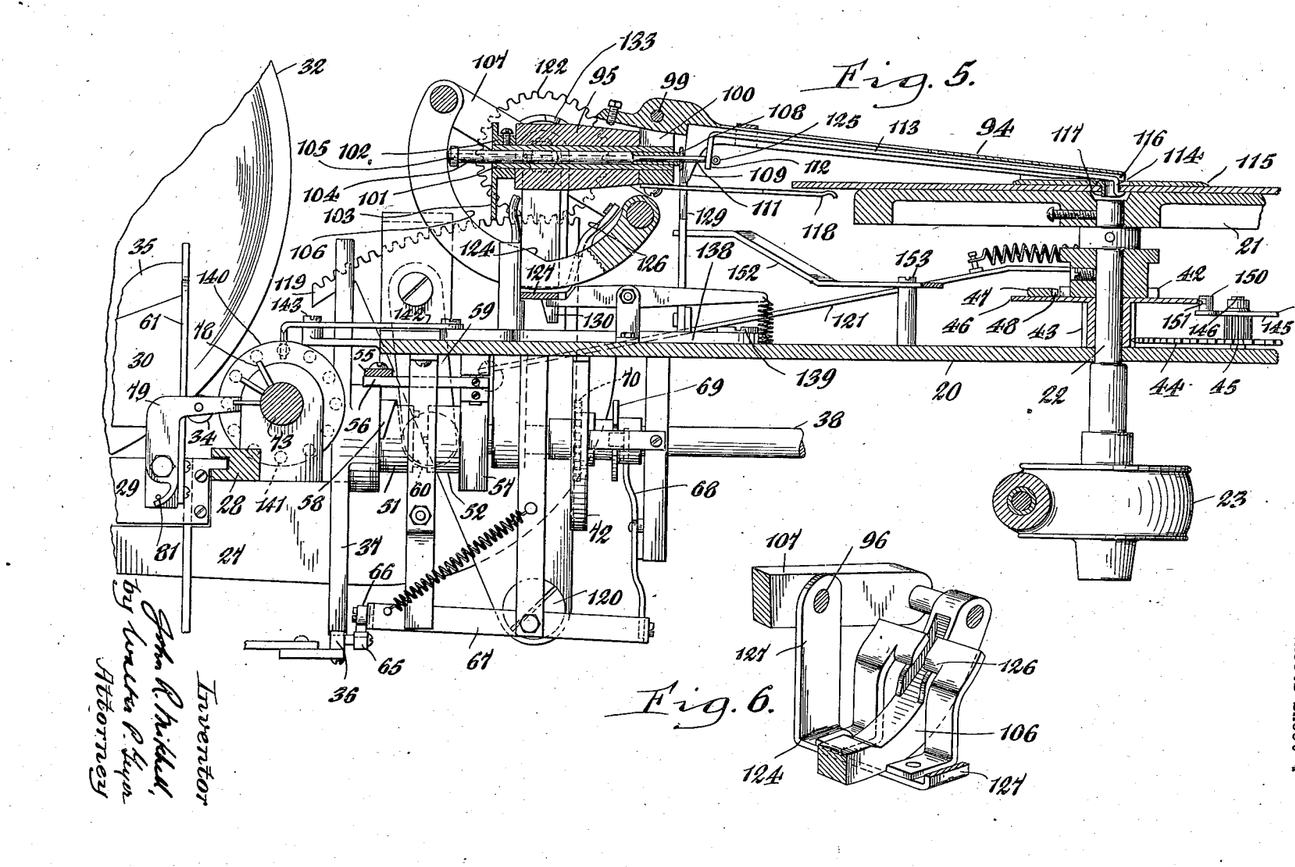
Figure 5 is an enlarged fragmentary vertical longitudinal section taken substantially on line 5—5, Figure 2.
Figure 6 is a fragmentary sectional perspective view of the cam structure for controlling the clamping of the transfer arm to a record.
Figure 7:
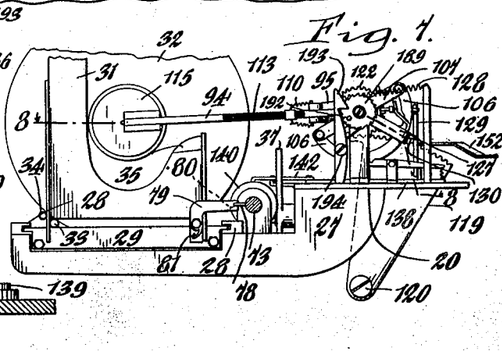
Figure 7 is a fragmentary front view of the phonograph, partly in section, showing the position of the parts with the transfer arm in position for picking a record from the magazine.

When the record holder 29 has been set in its predetermined position for selecting a given record for play, a transfer means is provided for projecting that record from the holder onto the turntable, and this means is preferably constructed as follows:

The numeral 94 indicates a transfer arm which is mounted for universal movement in such a way as to swing in a vertical plane to bring the record from the holder and transfer it onto the turntable and vice versa and also to swivel or rock about an axis to bring the record from a vertical plane in which it rests in the holder to a horizontal plane over the turntable and vice versa. To this end the transfer arm is mounted at its inner end for swiveling movement in a vertically-oscillating journal member 95 secured to the inner ends of trunnion shafts 96, 97 journaled in brackets 98 applied to the platform 20. The inner end of the transfer arm 94 is pivoted at 99 to the bifurcated end 100 of a shank 101 extending axially through the journal member 95 and provided at its projected end with a collar 102 having a three-fingered cam 103 applied thereto, this cam performing the function of transmitting motion to the transfer arm to swivel it to predetermined positions for engaging it with the record. Telescopically fitted within the shank 101 and slidable axially thereof is a sleeve 104 terminating at one end in a head 105 arranged to engage an arcuate cam member 106 carried by a rocking beam or frame 107 pivoted intermediate its ends on the adjoining portions of the trunnion shafts 96, 97. At its other end the sleeve 104 has an annular flange or head 108 which abuts against a bifurcated lateral projection 109 projecting from the inner end of the transfer arm 94 and at a predetermined time rock the arm outwardly about its pivot 99, a spring 110 serving to rock the arm in the opposite direction. Slidably fitted within the sleeve 104 is an actuating rod 111 which abuts at one end against the arcuate cam 106 and abuts at its other end against a lateral projection 112 of a latch bar 113 disposed coextensive with the transfer arm and terminating at its free end in a hook-like projection 114 which is adapted to pass through the record-hole and bear against one side of the record in the manner shown in Figure 5. At its outer or free end the transfer arm has a record-clamping plate or disk 115 which is adapted to bear against the opposite side of the record, and this plate may be pivoted as indicated at 116 to the outer end of the transfer arm to freely adapt itself to the face of the record. To center the record on the transfer arm, the clamping plate 115 has a split collar 117 projecting therefrom which enters the record-hole and is split at that point in contiguous relation to the latch hook 114. To further assist in supporting a record while being transferred, there is provided a yoke 118 which is suitably attached to the bifurcated end of the shank 101 and bears against the record adjacent its periphery and on that side thereof against which the latch hook 114 bears. During the playing of a record the transfer arm and associated parts assume the position shown in Figure 5, and the record-engaging parts 114, 115 and 118 in no way interfering with the free rotation of the record on the turntable.

Figure 8:
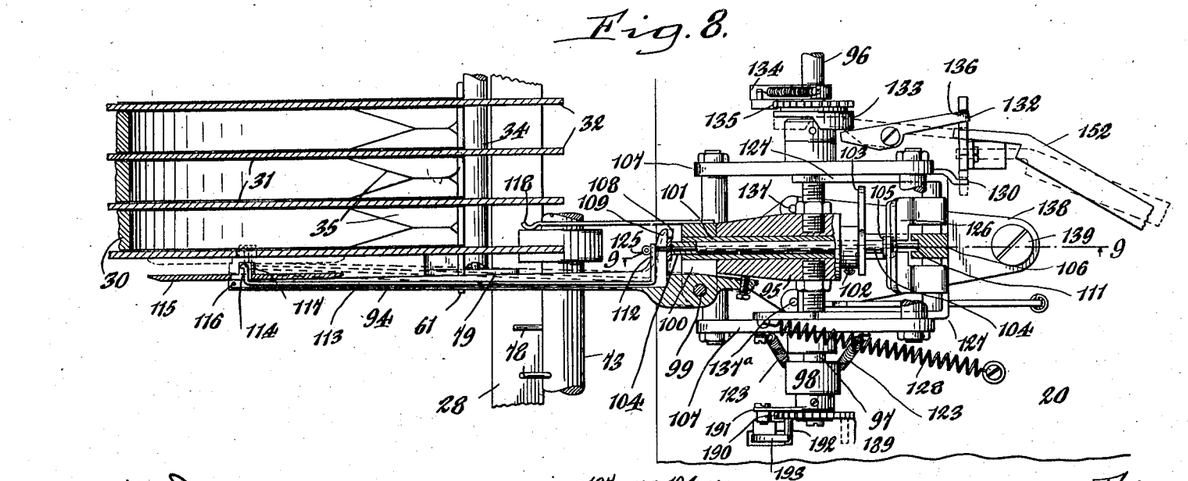
Figure 8 is an enlarged fragmentary horizonal section taken substantially on line 8—8, Figure 7.
Figure 9:
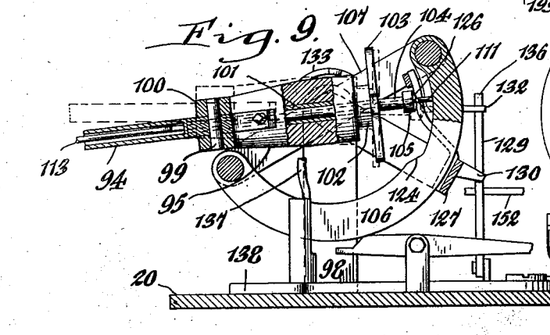
Figure 9 is a fragmentary longitudinal section taken substantially in the plane of line 9—9, Figure 8.
Figures 10, 11, 12:
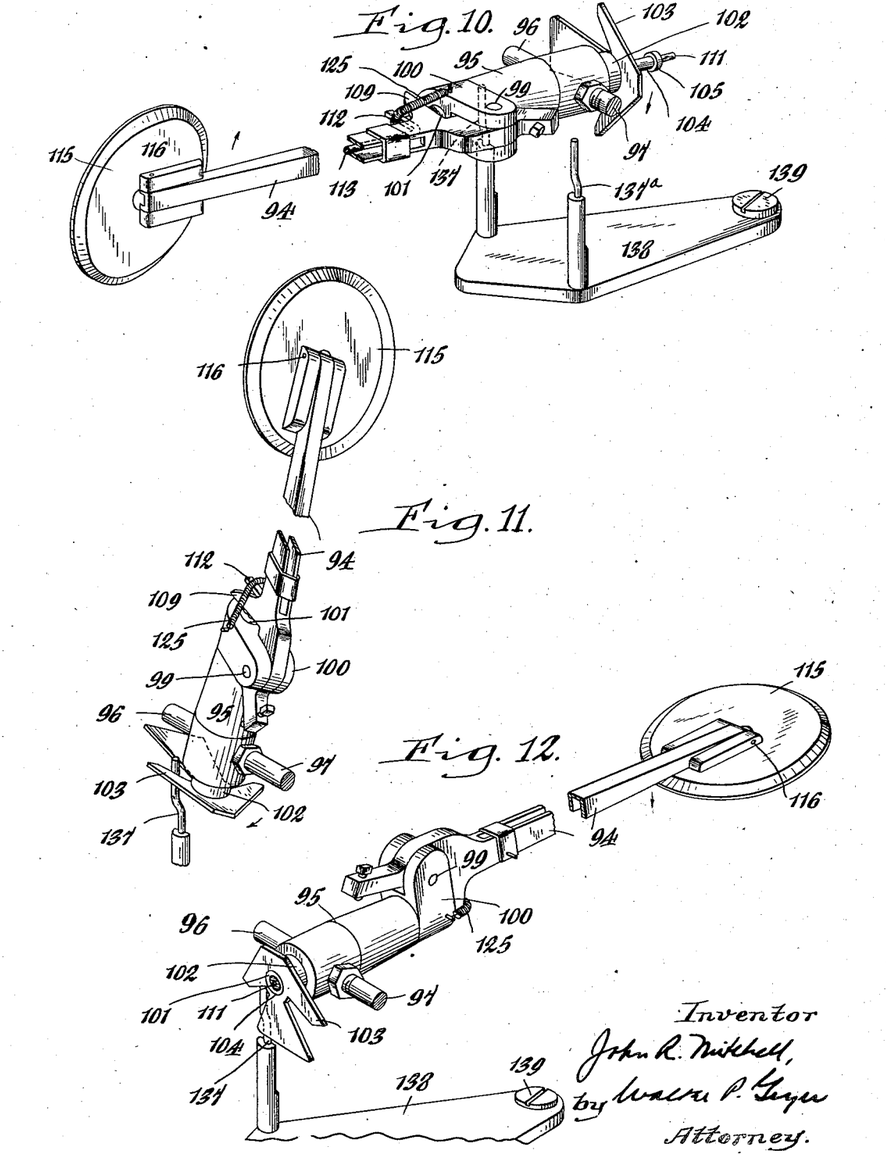
Figures 10, 11 and 12 are fragmentary perspective views of the record transfer arm showing its different positions from record pick-up position to playing position.

The means for transmitting motion to the trunnion shaft 96 to swing the record-engaging arm 94 and transfer a record to and from the turntable and vice versa, consists of a gear segment 119 pivoted at 120 to the adjoining bracket 98 and connected by a pitman or connecting rod 121 to the gear 41 of the clutch drive assembly geared to the turntable spindle. This segment meshes with a gear 122 fixed on the trunnion shaft 96 so that whenever motion is transmitted to the gear 41 the transfer arm is swung in one direction or the other. During the extreme ends of these movements the transfer arm encounters the cam-bearing frame 107 and rocks it in one direction or the other and during the medial travel of the arm this frame is maintained in a neutral position by a spring 123. The arcuate cam 106 has an incline 124 adjacent one end so that as the transfer arm swings from the record-holder to a position over the turntable, the latch-clamping actuating rod 111 encounters such incline as soon as the record is withdrawn from the holder and shifts the latch bar 113 in a direction to clamp the hook 114 to the record. On the return stroke of the transfer arm, that is, returning the played record to the holder, this actuating rod 111 will at a predetermined time in the stroke of the transfer arm again encounter the incline and a spring 125 applied to the actuating rod 111 will allow the latter to return to its initial position and release the grip of the latch bar hook 114 from the record. At predetermined times in the cycle of movement of the transfer arm, the head 105 of the sleeve 104 will encounter a centrally-split cam plate 126 secured to a U-shaped bracket 127 loosely supported from the trunnion shafts 96, 97 and having a spring 128 connected thereto for urging it to rock in a clockwise direction to assume the substantially pendant position shown in Figure 5. When the head of the sleeve 104 encounters the cam plate 126, say adjacent the end of the return stroke of the transfer arm, the sleeve will be shifted by that cam plate in a direction to rock the transfer arm 94 about its pivot 99 to withdraw the plate-collar 117 from the record-hole and allow the record to drop by gravity into its companion holder-pocket 31. As a record is withdrawn from the holder to be transferred to the turntable, the head of the sleeve 104 moves off the cam plate 126, resulting in the transfer arm being rocked by the spring 110 against the face of the record and into clamping relation therewith. It should be noted here that in the pick-up position of the transfer arm shown in Figures 8 and 9, the U-shaped, cam-plate carrying bracket 127 is in the position there shown and is held in that position against the resistance of its spring 128 by a vertically-swinging toothed latch 129 with which a portion 130 of said frame is adapted to engage, whereby the cam-plate 126 is held in a stationary position during the initial portion of the pick-up stroke of the transfer arm, so that the headed sleeve 104 will move relatively thereto and recede from the cam plate for the purpose just above set forth. After this takes place and before the transfer arm deposits the record on the turntable, the latch 129 is automatically shifted to release the cam-plate bracket 127 from supporting engagement with the latch-tooth and permit the spring 128 to return such bracket to its normally pendant position, shown in Figure 5.

The means for automatically tripping the latch 129 to release the cam-carrying bracket 127 therefrom consists of a horizontally-swinging rock lever 132 one arm of which is disposed in the path of a cam 133 loosely mounted on the trunnion shaft 96 and adapted to revolve in one direction therewith through the medium of a ratchet arm 134 fixed on the shaft and engageable with the ratchet wheel 135 which may constitute an integral part of the cam 133. The other arm of this rock lever abuts against a shoulder 136 on the latch 129 so that during the clockwise rotation of the trunnion shaft 96 and the corresponding movement of the transfer arm 94 from the record holder to the turntable, this cam at a predetermined time encounters the rock lever and shifts it in a direction to swing the latch 129 rearwardly out of supporting engagement with the bracket 127. During the counterclockwise rotation of the trunnion shaft 96 and the corresponding swinging movement of the transfer arm from the turntable to the record-holder, the ratchet arm 134 merely idles over the ratchet 135 so that no motion is imparted to the cam 133. At this stage it should be noted that before another record can be picked from the holder and deposited on the turntable it is necessary that the transfer arm make an idle movement from the holder back to the turntable so that there is nothing to interfere with the lateral sliding of the holder to pre-set it into position for playing the next record. During this idle stroke of the transfer arm from the holder to the turntable and back again, the cam 133 retains the latch 129 in a released position where it does not interfere with the idle travel of the bracket 127 with the rocking beam 107, the cam however being turned during the idle pick-up stroke of the transfer arm to allow the rock lever to engage the flat side of the cam disk and project the latch 129 into position where it will support the cam plate bracket 127 in its position shown in Figure 9.

In the transferring of a record from the holder to the turntable and vice versa, it is necessary to turn the transfer arm 94 in its journal member 95 so as to bring the record, in one instance, from a vertical position to a horizontal position and, in the other instance, from a horizontal position to a vertical position, respectively, and in this connection the swiveling movement imparted to the transfer arm is performed between the extremities of its strokes. For this purpose the three-fingered cam 103, which is mounted on the transfer arm carrying shank 101, is arranged to engage one or the other of a pair of upright tappet posts 137, 137ª rising from a horizontally-swinging lever 138 pivoted at 139 to the top of the platform 20. The lever 138 is adapted to assume one or the other of two adjustable positions wherein the tappet post 137 or 137ª is disposed in the path of movement of the three-fingered cam 103 to rock the transfer arm axially in either one direction or the other, depending upon which side of the record is desired to be played. Let it be assumed that the post 137 governs the rocking of the transfer arm to play the right side of the record and the post 137ª governing the rocking of the arm in the opposite direction to play the opposite or left side of the record, the designated right side of the record being that side of the record facing the front of the machine. As the transfer arm is swung with a record from the holder, the notch between adjoining fingers of the cam 103 encounters, say, the post 137, and one of the edges of that notch wipes over the post during the swinging of the transfer arm and automatically oscillates the transfer arm about the axis of its journal member to swing the record from its vertical position to its horizontal position for deposit on the turntable. On the return stroke of the transfer arm, the same notch of the cam 103 engages the post 137 and in like manner swings the record from a horizontal position to a vertical position in which position it is deposited in the record holder. Should the lever 138 be adjusted to its other position, that is, to play the left side of the records, then the notch between the other two fingers encounters the post 137ª and in like manner effects the swiveling of the transfer arm in the proper direction to bring that side of the record in playing position over the turntable.

The adjustment of the post-carrying lever 138 to predetermine the side of the record desired for play, may be controlled in any suitable manner by shifting that lever to one or another of its two positions. The means shown in the drawings, however, is preferable and consists of a collar 140 fixed on the selector pin shaft 73 and having an annular row of teats or projections 141 on the face thereof which correspond to those selector buttons 82 numbered or otherwise identified to play one side of the record, and the intervening spaces between the teats corresponding to those selector buttons identified to play the opposite side of the record. Cooperating with the teats and intervening depressions of this collar is a horizontally-swinging lever 142 pivoted intermediate its ends at 143, one arm of the lever contacting with the teated portion of the collar and the other arm of the lever being connected to the adjustable lever 138. By this construction, should the user select a piece or selection borne by the right side of a record, the shaft 73 will be arrested at a position wherein a teat on the collar 140 will be encountered and accordingly drop the lever 138 to a position of adjustment which will bring the post 137 into the path of the fingered cam 103. On the other hand, should the user make a record selection which appears on the left side of a record, then the lever 142 will drop into a depression and correspondingly rock the lever 138 to an adjusted position wherein the post 137ª will be brought into the path of the finger cam 103 so as to properly bring the proper side of that record in an exposed position on the turntable.

Figure 4:
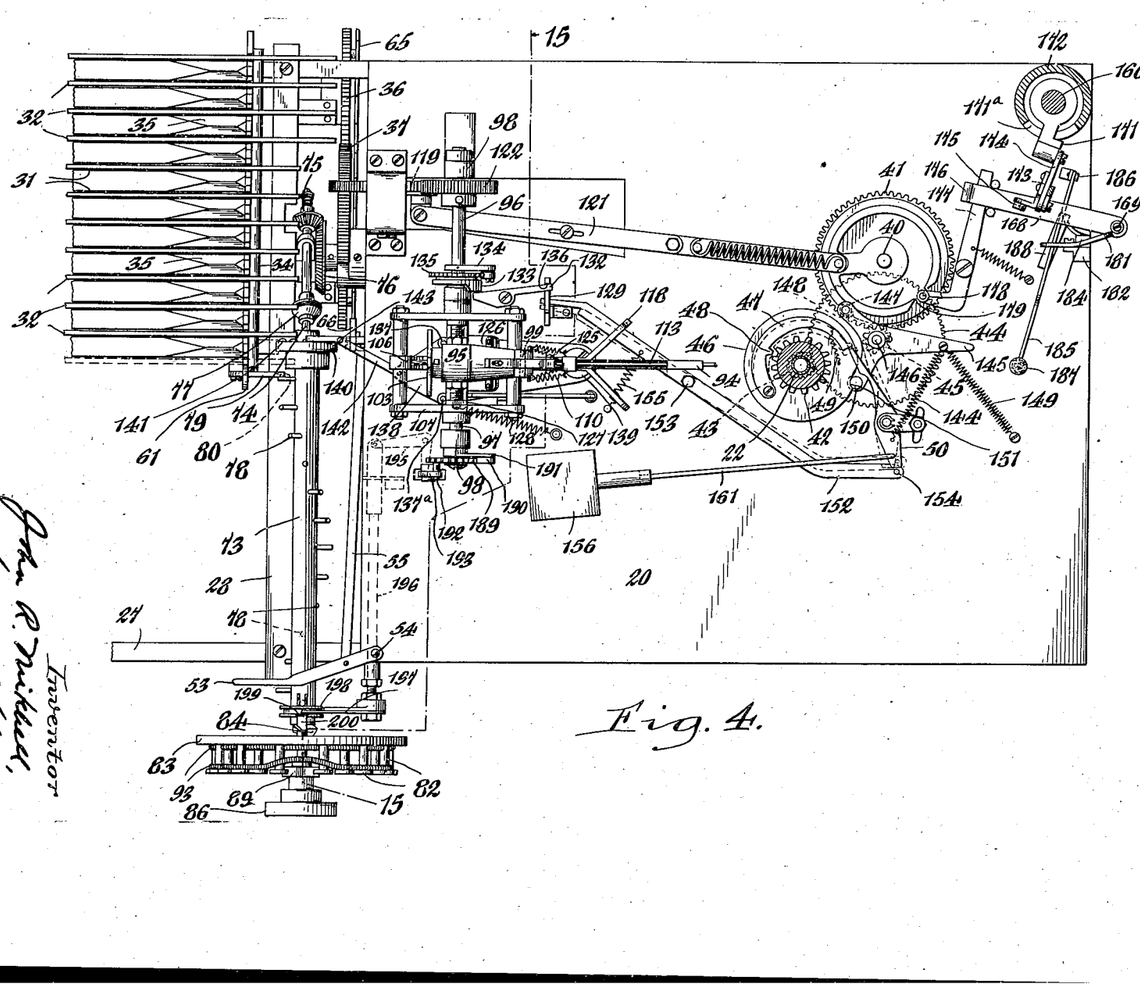
Figure 4 is an enlarged fragmentary top plan view thereof, partly in section, with the turntable and tone arm removed.

During the movements of the record holder or magazine 29 to record-selecting position and the transfer operation of the arm 94, that is, transferring a played record back to the magazine and the subsequent idle movement of the arm to and from the turntable preparatory to picking up the next selected record and depositing it on the turntable, the driven gear 41 makes two revolutions. For the purpose of arresting this gear and the movement of the mechanisms driven thereby, the clutch-releasing trip lever 50 is provided which is urged in one direction by a coin spring 144 to bring it into the path of the revolving clutch-pawl 47 and shift it to the released position shown in Figure 4, wherein the parts are in record-playing position. Interposed between the gear 41 and the clutch disk 46 is a latch lever 145 pivoted at 146 and having a roller 147 on one arm thereof adapted to engage the peripheral flange of the gear 41 during the rotation of such gear, and when the clutch is disengaged, to engage a recess 148 in such flange, a spring 149 urging such lever in a direction to maintain said roller in contact with the gear flange. Another arm of this lever has a roller 150 rising therefrom which bears at one side against the periphery of the clutch disk 46, while its other side is adapted to abut against the opposing edge of the trip lever 50. The periphery of the clutch disk has an indented portion or notch 151 with which said roller 150 is adapted to engage in the clutch-released position shown in Figure 4. When the trip lever 50 is withdrawn from engagement with the clutch lever 47 to its released position to effect the automatic engagement of the clutch lever with the gear 43, the latch lever 145 is simultaneously rocked about its pivot by reason of its roller 150 riding out of the clutch disk recess, and whereupon the other roller

147 is moved out of the gear-notch 148 and the lever 145 held in that position by the peripheral flange of the gear 41, during which time motion is transmitted to the latter to operate the record change mechanism. When the lever 145 recedes from the clutch disk notch, its roller 150 abuts the trip lever 50 and retains the latter in its retracted position clear of the clutch lever 46.

As previously stated, the driven gear 41 makes two revolutions during each record-changing and selecting cycle, and unless some means were provided to prevent it, the latch lever 145 would be swung in a direction to allow the trip lever 50 to be swung by its spring 144 and effect the release of the clutch lever 47 at the end of a single revolution of such gear, because the latch lever roller 147 would drop into the gear-notch 148. However, to prevent this happening, I provide a horizontally-swinging lever 152 pivoted intermediate its ends at 153 and having a pin 154 on one arm which, in the clutch-engaged position of the parts, abuts the adjoining side of the trip lever 50 to hold it in its withdrawn position and in turn hold the latch lever 145 in its corresponding position against turning, so that its rollers 147, 150 will not engage the clutch-disk and gear notches, respectively. The other arm of the lever 152 abuts against the lower end of the latch 129 which retains said lever in a position to prevent or trap the swinging of the trip lever 50 to clutch-released position. When this latch is automatically shifted just prior to a selected record being deposited on the turntable to release the cam plate 127 in the manner heretofore described, it shifts the lever 152 to the full line position shown in Figure 4, where it is clear of the trip lever 50 and the latter is then free to be swung by its spring 144 into the path of the revolving clutch lever 47 to release the clutch and arrest the transfer mechanism, after which the record starts to play. When the latch 129 is restored to its position for supporting engagement with the cam-carrying bracket 127, it simultaneously acts to pre-set the lever 152 for restoration to its initial position, a spring 155 connected to such lever urging the latter to such position, as soon as the lever 50 is tripped, with its pin 154 in abutting engagement with the latter to retain it in a clutch-engaged position until such time as it is automatically released at the end of playing a record.

Any suitable means may be employed for releasing the trip lever 50 at the end of playing a record so as to clutch the driven gear 41 to the turntable spindle 22 and operate the record-changing mechanism. That shown in the drawings, by way of example in Figures 4 and 18, consists of an electric switch-control means comprising a solenoid 156 included in the circuit 157 having a switch 158 moved to closed position by an arm 159 secured to the lower end of the tone arm post 160 when the tone arm reaches the end of playing a given record. The closing of this switch energizes the solenoid 156 and retracts its plunger to actuate a link 161 connected at its free end to the trip lever 50 and in turn move such lever to release the clutch lever 47 and allow its automatic movement into the clutch-engaging position shown by dotted lines in Figure 4.

Figure 18:
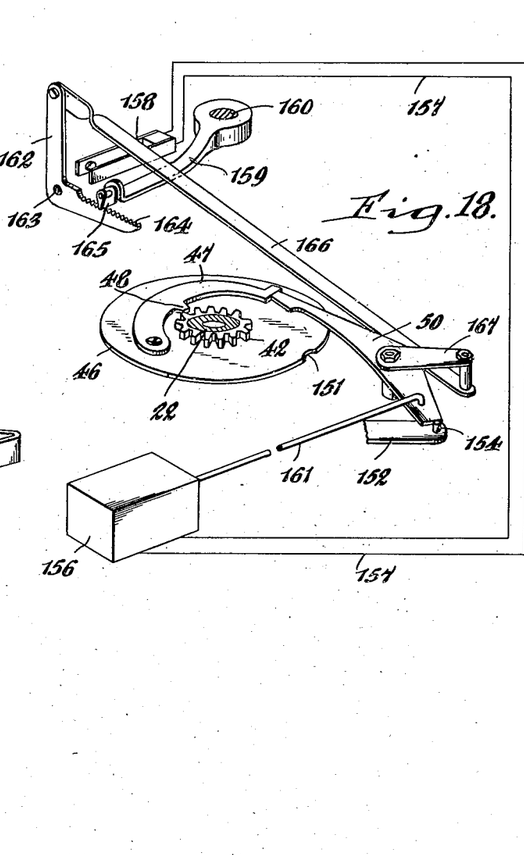
Figure 18 is a perspective view, partly diagrammatic, of the tone arm trip mechanism for effecting the clutching of the drive mechanism to restore the record to its position within the magazine after play.

Instead of tripping the lever 50 to effect the engagement of the clutch by electrical means, a mechanical means may be employed which is likewise shown in Figure 18 and consists of a bell crank lever 162 pivoted at 163 and having ratchet teeth 164 on one arm thereof with which a pawl 165 is adapted to engage, such pawl being mounted on the radial arm 159 which is also employed to close the switch 158. The other arm of the bell crank is connected by a link 166 with an arm 167 fixed to rock with the trip lever 50. By this construction when the tone arm reaches the end of playing position, the pawl 165 rides over the ratchet teeth 164 and ultimately effects the rocking of the bell crank lever 162 in a direction to move the trip lever 50 clear of the clutch lever 47 and allow the latter to swing automatically to its clutch-engaging position.

Means are provided for automatically elevating the tone arm clear of the record after play and for this purpose a vertically-shiftable track bar 168 is disposed over the platform 20 adjacent the tone arm post 160 and supported at its outer end for tilting movement on a stud 169 to which a coil spring 170 is applied and which permits a limited vertical displacement of the track bar. Pivoted to an arm 171 radiating from the tone arm post 160 and extending through a slot 171ª in the housing 172 is a vertically-swinging lever 173 connected by a link 174 with the tone arm and having a roller 175 thereon which engages the track bar 168. At its free end the latter has a depending or inclined projection 176 and engageable with this projection for elevating the track bar in an outwardly and downwardly inclined position is a trip lever 177 having a roller 178 at one end thereof which bears against the flange of the driven gear 41, such flange having a depression 179 in its periphery for the purpose of actuating the trip lever. During the playing of a record the lever roller 178 is engaged in the depression 179, as shown in Figure 4, and as soon as the driven gear 41 is clutched to the turntable spindle to operate the transfer mechanism, this roller rides out of the depression and the lever 177 is swung in a direction to engage the incline 176 of the lever 168 and accordingly tilt the latter upwardly at its free end, whereupon the tone arm is elevated by reason of the swinging movement imparted to the lever 173 and immediately thereafter the tone arm swings outwardly by gravity to a position at one side of the turntable, the post arm 171 abutting the end of the slot 171ª in this position.

Means are provided for setting the tone arm in position for playing a 10″ and 12″ record and as shown in the drawings the tone arm is provided at one side thereof with an abutment or roller 180 which in the non-playing position of the tone arm rests upon a vertically-swinging arm 181 pivoted on a post 182 rising from the platform 20. This arm has an integrally-formed trigger 183 which abuts against the notched upper end of a vertically-shiftable slide bar 184. The length of the arm 181 is such that in playing a 10″ record, when the tone arm is moved inwardly, its roller 180 will ride off of the arm and the tone arm will swing downwardly by gravity into playing engagement with that record. In playing a 12″ record it is necessary to shift the arm 181 to a position where it will allow the tone arm to drop therefrom sooner than for a 10″ record, and for this purpose a vertically-swinging lever 185 is pivoted at one end at 186 on the platform 20, the same being connected intermediate its ends to the slide bar 184 and provided at its free end with a pad 187 with which the marginal portion of a 12″ record is adapted to engage when the latter is placed on the turntable to thereby shift the lever downwardly and thence move the slide bar 184 therewith to bring its notched end out of engagement with the trigger 183 of the arm 181 and allow the latter to swing downwardly by gravity or from the weight of the tone arm resting thereon. A flat spring 188 may be provided which tends constantly to move the slide bar to its upward position for retaining the arm 181 in its elevated position.

Means are provided for automatically restoring a selector button 82 to its retracted position after the corresponding record selected by it has been played and during the act of transferring that record from the turntable back to the record holder 29. To this end the trunnion shaft section 97 has a ratchet wheel 189 loosely mounted thereon and engageable with this wheel is a pawl 190 mounted on an arm 191 fixed to said shaft section so that when the transfer arm 94 is swung backwardly motion is transmitted to the ratchet wheel. Mounted on the face of the latter is a pin 192 which at a predetermined time is adapted to engage a vertically swinging lever 193 pivoted at 194 and adapted to abut at its lower end against a horizontally-swinging bell crank 195 connected at one end to a reciprocating rod 196 suitably supported on the underside of the platform 20 and provided at its free end with a bifurcated arm 197 embracing a grooved collar 198 slidably keyed on the front end of the selector shaft 73 and having an arm 199 radiating therefrom and terminating at its upper end in a forwardly-facing flange 200 disposed for sidewise abutting engagement with the arm 84 so as to revolve therewith and for endwise engagement with one or another of the selector pins 82 to restore them to their initial non-selecting position. A spring 201 connected to the bell crank lever 195 tends constantly to urge it and the parts connected thereto to a position wherein the radial arm 199 is clear of the projected path of the selector buttons and wherein the lever 193 is restored to a position in the path of the ratchet wheel pin 192. By this construction, it being understood that when a record is desired to be played its companion selector button 82 is depressed and during the rotation of the selector shaft 73 the arm 84, as well as the arm 199, revolves therewith until said arm 84 encounters the depressed selector pin, when further rotation of the parts is arrested and the setting made for selecting the record to be played. When this arrested position of the arms 84 and 199 is effected, the projecting flange 200 of the latter is in axial alinement with the depressed selector button 82, so that when the bell crank lever 195 is actuated during the movement of the transfer arm 94, as previously described the arm 199 will be shifted in an axial direction and its flange 200 will project the depressed selector button forwardly into its initial non-selecting position and out of the path of travel of the arm 84, so that the latter is free when effecting the next record selection.

I claim as my invention:

1. In an automatic phonograph, a turntable, a record magazine disposed at one side of the turntable for supporting a plurality of records on edge and adjustable horizontally to bring one or another of the records to a given selective position relative to the turntable-axis, a combined vertically-swinging and oscillatory record transfer member fulcrumed between the turntable and the record magazine and provided at its free end with a coupling element engageable with the axial opening of a record, and means for actuating said transfer member in predetermined sequence to swing it into engagement with a record selected for play and then withdraw the record from the magazine and, during such swinging movement, move said member in a direction to present the record to the turntable for play.

2. In an automatic phonograph, a turntable, a record magazine at one side of the turntable for supporting a plurality of records edgewise at right angles to the turntable and adjustable horizontally to bring one or another of the records to a given selective station substantially axially of the turntable, means for selectively governing the movements of the magazine to record-selecting positions, a combined vertically-swinging and swiveling transfer arm fulcrumed between the turntable and the magazine for transferring a record from the magazine to the turntable, a combined record-clamping and centering means applied to said transfer arm for releasable coupling engagement with the record-opening to support the record during transfer and center it axially over the turntable during play, means operatively connected to said transfer arm and rendered operative during its swinging movements for swiveling it in one direction or the other to play one side or the other of the record, and means operatively connected to said record-clamping means for governing its clamping and releasing positions relative to the record.

3. In an automatic phonograph, a turntable, a record magazine at one side of the turntable for supporting a plurality of records edgewise at right angles to the turntable and adjustable horizontally to bring one or another of the records to a given selective station substantially axially of the turntable, a combined vertically-swinging and swiveling transfer member fulcrumed between the turntable and the magazine for transferring a record to the turntable and vice versa, and means for selectively governing the movements of the magazine to record-selecting positions, comprising a rotatable selector shaft disposed alongside the path of travel of the magazine and having a plurality of radial stop pins thereon arranged in substantially spiral fashion lengthwise of the shaft and corresponding in number to the records, a stop-lug applied to said magazine for abutting engagement with one or another of said stop pins for arresting the movement of the magazine at a selected position, a plurality of individual means corresponding in number to the records and selectively movable to positions to stop the rotation of said selector shaft to predetermine the selective position of the magazine, means for restoring each individual means to normal position after it has stopped the rotation of the selector shaft at the companion selected position, and means for actuating the magazine, the transfer arm and selector shaft in predetermined sequence.

4. In an automatic phonograph, a turntable, a record magazine at one side of the turntable for supporting a plurality of records edgewise in a row at right angles to the turntable and adjustable horizontally to bring one or another of the records to a given selective station substantially axially of the turntable, spring means for urging said magazine to a forward selective position, selectively adjustable means disposed along the path of travel of the magazine for arresting it at predetermined positions, means for releasably latching the magazine in such positions, means for transferring a selected record from the magazine to the turntable and vice versa, actuating means therefor, drive means for propelling said magazine from a selective position to its initial non-selective position, said drive means including a clutch, means initiated by the magazine for actuating said clutch to its engaged position at a predetermined time in the spring-urged movement of the magazine for effecting the propulsion of the latter in the opposite direction to its initial position, and means for actuating said clutch to its released position at a predetermined time in the movement of the magazine in such opposite direction.

5. In an automatic phonograph, a turntable, a record magazine at one side of the turntable for supporting a plurality of records edgewise in a row at right angles to the turntable and adjustable horizontally at bring one or another or the records to a given selective station relative to the turntable, said magazine including division plates between which the records are inserted and pairs of supporting bars at opposite sides of the record-centers of the records for supporting the records edgewise in horizontal axial alinement, one pair of bars constituting supports for records of one size and the other pair of bars constituting supports for records of a larger size, and means disposed between said magazine and the turntable for transferring a selected record to and from playing relation with the turntable.

6. In an automatic phonograph, a turntable, a record magazine at one side of the turntable for supporting a plurality of records edgewise in a row at right angles to the turntable and adjustable horizontally to bring one or another of the records to a given selective station relative to the turntable, a gear rack applied to said magazine, a driven gear engaging said rack for propelling the magazine from a selective position to its initial non-selective position, means connected to the magazine for yieldingly urging it to its selective position, means for selectively controlling the movement of the magazine to such last-named position, means for releasably latching said magazine in its selective and non-selective positions, and clutch means for controlling the operation of said driven gear in a direction to restore the magazine to its initial position and the idling of such gear during the movement of the magazine in the opposite direction.

7. In an automatic phonograph, a turntable, a record magazine at one side of the turntable for supporting a plurality of records edgewise in a row at right angles to the turntable and adjustable horizontally to bring one or another of the records to a given selective station relative to the turntable, a gear rack applied to said magazine, a driven gear engaging said rack for propelling the magazine from a selective position to its initial non-selective position, means connected to the magazine for yieldingly urging it to its selective position, means for selectively controlling the movement of the magazine to such last-named position, means for releasably latching said magazine in its selective and non-selective positions, clutch means for controlling the operation of said driven gear in a direction to restore the magazine to its initial position and the idling of such gear during the movement of the magazine in the opposite direction, trip means operatively connected with such clutch and disposed in the path of yieldable travel of the magazine for actuation thereby at a predetermined time in such travel for shifting the clutch to its engaged position and means associated with said clutch and governed thereby shifting the clutch to a released position at a predetermined time in the movement of the magazine to its initial position.

8. In an automatic phonograph, a turntable, a record magazine at one side of the turntable for supporting a plurality of records edgewise in a row at right angles to the turntable and adjustable horizontally to bring one or another of the records to a given selective station relative to the turntable, a driven shaft having clutch-controlled means for propelling said magazine in one direction to a non-selective position, yieldable means for urging the magazine in the other direction, to a selective position, means for selectively controlling the movement of the magazine to such last-named position, means including a ratchet bar and pawl associated with said magazine for releasably latching it in both its selective and non-selective positions, and means for actuating said pawl at predetermined times into and out of latching engagement with its ratchet bar, said means including a cam operatively connected to said driven shaft and a connection between said cam and said pawl.

9. In an automatic phonograph, a turntable, a holder at one side of the turntable for supporting a record edgewise at substantially right angles to the turntable, and means disposed between said holder and said turntable for transferring the record to and from the same and for turning it to and from a horizontal playing position, comprising a vertically-swinging journal member having a shank swiveled thereon at right angles to its axis, a transfer arm fulcrumed at its inner end to said shank and provided at its outer end with a plate adapted to engage one side of a record and having a slotted centering collar thereon engageable with the record-hole, and a shiftable latch bar applied to said arm and having a hook at its outer end extending through said collar and movable into and out of bearing contact with the other side of the record about its center hole.

10. In an automatic phonograph, a turntable, a holder at one side of the turntable for supporting a record edgewise at substantially right angles to the turntable, and means disposed between said holder and said turntable for transferring the record to and from the same and for turning it to and from a horizontal playing position, comprising a vertically-swinging journal member having a shank swiveled thereon at right angles to its axis, a transfer arm fulcrumed at its inner end to said shank and provided at its outer end with a plate adapted to engage one side of a record and having a slotted centering collar thereon engageable with the record-hole, a shiftable latch bar applied to said arm and having a hook at its outer end extending through said collar and movable into and out of bearing contact with the other side of the record about its center hole, a spring for normally urging said latch bar to its released position, a shiftable actuating rod mounted in said journal member and in operative engagement at one end with said latch bar, and cam means engageable with the other end of said actuating rod for shifting said latch bar at predetermined times into hooked engagement with the record.

11. In an automatic phonograph, a turntable, a holder at one side of the turntable for supporting a record edgewise at substantially right angles to the turntable, and means disposed between said holder and said turntable for transferring the record to and from the same and for turning it to and from a horizontal playing position, comprising a vertically-swinging journal member having a shank swiveled thereon at right angles to its axis, a transfer arm fulcrumed at its inner end to said shank and provided at its outer end with plate and hook means engageable with opposite sides of the record about its center hole for releasably clamping the record thereto, a spring connected to said arm for swinging it into clamping engagement with a record, and a shiftable actuating member guided in said journal member and in operative engagement at one end with said transfer arm, and cam means engageable with the other end of said actuating member for swinging said arm at predetermined times against the resistance of said spring to a record-released position.

12. In an automatic phonograph, a turntable, a record magazine disposed at one side of the turntable for supporting a plurality of records on edge and adjustable horizontally to bring one or another of the records to a selective position relative to the turntable, means tending constantly to urge said magazine in one direction, selective means for arresting the movement of the magazine in such direction to bring the selected record to its proper selective position relative to the turntable, said selective means including a plurality of push buttons corresponding in number to the records and operable at the will of the user to select one or more records for play, a rotatable selector shaft disposed parallel to the course of movement of the magazine and having stop pins thereon, one for each record, disposed at predetermined intervals longitudinally thereof, the selective movements of said shaft being controlled by said push buttons, means for intermittently rotating the selector shaft, a member on said magazine engageable with one or another of said stop pins when the magazine is moved in one direction for arresting the movement of the magazine in accordance with the record selected, said member being inactive to arrest said magazine when the latter is moved in the reverse direction, clutch-controlled means for governing the movement of the magazine in such reverse direction at a predetermined time in the cycle of operations of the machine, a combined vertically-swinging and oscillatory record pick-up arm fulcrumed between the turntable and the record magazine and provided at its free end with a coupling member engageable with the axial opening of a record, and means for actuating said pick-up arm in predetermined sequence to swing it into engagement with a record selected for play and then withdraw the record from the magazine and, during such swinging movement, oscillate said arm to present the record to the turntable for play, means for swinging said pick-up arm vertically from a normal position over the turntable to an operable record-engaging position with the magazine and vice versa, means for oscillating the pick-up arm at predetermined times during such swinging movements to properly present the record to the turntable and magazine, respectively, and means for actuating the foregoing means.

13. In an automatic phonograph, the combination with a turntable, a movable record magazine at one side of said turntable for adjustment to one or another of a plurality of selective stations, and means for transferring a record from the magazine to the turntable, of a rotatable selector shaft disposed alongside the path of travel of the magazine and having a plurality of radial stop pins thereon arranged in substantially spiral fashion lengthwise thereof and corresponding in number to the records, a stop member applied to said magazine for abutting engagement with one or another of said stop pins for arresting the magazine at a selective position, a plurality of individual means corresponding in number to the records and selectively movable to positions to stop the rotation of said selector shaft to predetermine the selective position of the magazine, and means for restoring each individual means to normal position after it has stopped the rotation of the selector shaft at the companion selected position.

14. In an automatic phonograph, a turntable, a movable record magazine at one side of said turntable for adjustment to one or another of a plurality of selective positions substantially axially of the turntable, means interposed between the turntable and the magazine for transferring a record from the latter to the former and vice versa, means for selectively governing the movements of the magazine to record-selecting positions, comprising a rotatable selector shaft disposed along the path of travel of the magazine and having a plurality of radial stop pins thereon arranged in substantially spiral fashion lengthwise of the shaft and corresponding in number to the records, a stop member applied to said magazine for abutting engagement with one or another of the stop pins for arresting the movement of the magazine at a selective position, a plurality of individual means corresponding in number to the records and selectively movable to positions to stop the rotation of said selector shaft to predetermine the selective position of the magazine, means operatively connected to and governed by said record-transfer means at a predetermined time in its movement for restoring each individual means to normal position, and means for actuating the magazine, the transfer means and selector shaft in predetermined sequence.

15. In an automatic phonograph, a turntable, and means for transferring a record positioned edgewise at one side of the turntable to a position in playing relation to the turntable to play one side or the other of the record, comprising a vertically-swinging journal member having a shank swiveled thereon at right angles to its axis, a combined vertically-swinging and swiveling transfer arm fulcrumed at its inner end to said shank and provided at its outer end with releasable record-changing means including elements engageable with opposite sides of the record about its center hole, means connected to said arm for normally urging it into clamping engagement with a record, a shiftable actuating member guided in said journal member and in operative engagement at one end with said transfer arm, cam means engageable with the other end of said actuating member for swinging said arm at predetermined times in a direction to release its clamping means from the record, a cam member applied to the inner end of the journal member shank, and means disposed in the path of travel of said cam member during the swinging movements of the journal member for selectively engaging said cam member and actuating it to swivel the transfer arm in one direction or the other to play one side or the other of the record.

16. In an automatic phonograph, a turntable, and means for transferring a record positioned edgewise at one side of the turntable to a position in playing relation to the turntable to play one side or the other of the record, comprising a vertically-swinging journal member having a shank swiveled thereon at right angles to its axis, a combined vertically-swinging and swiveling transfer arm fulcrumed at its inner end to said shank and provided at its outer end with releasable record-clamping means including elements engageable with opposite sides of the record about its center hole, means connected to said arm for normally urging it into clamping engagement with a record, a shiftable actuating member guided in said journal member and in operative engagement at one end with said transfer arm, cam means engageable with the other end of said actuating member for swinging said arm at predetermined times in a direction to release its clamping means from the record, a cam member applied to the inner end of the journal member shank and having a plurality of cam elements thereon, an adjustable member having a plurality of companion, cam-engaging tappets thereon, one of said tappets being engageable with its companion cam elements during the vertically-swinging movements of the journal member for swiveling the transfer-arm-shank in a direction to present one side of the record for play and the other tappet being engageable with its companion cam element for swiveling the transfer-arm-shank in the opposite direction to present the other side of the record for play, and means operatively connected to said adjustable members for selectively positioning it in one or the other of its record-swiveling positions.

JOHN R. MITCHELL.